US012724943B2

(12) United States Patent
Xie et al.

(10) Patent No.: US 12,724,943 B2
(45) Date of Patent: Sep. 1, 2026

(54) POWER SYSTEM OPERATION SIMULATION METHOD, SIMULATION PLATFORM AND DEVICE

(71) Applicant: STATE GRID ZHEJIANG ELECTRIC POWER CORP NINGBO POWER SUPPLY COMPANY, Ningbo (CN)

(72) Inventors: Yuzhe Xie, Ningbo (CN); Yi Wang, Ningbo (CN); Peng Li, Ningbo (CN); Xiao Zheng, Ningbo (CN); Zhi Li, Ningbo (CN); Pengcheng Wang, Ningbo (CN); Bowen Zhu, Ningbo (CN); Hao Zhang, Ningbo (CN)

(73) Assignee: STATE GRID ZHEJIANG ELECTRIC POWER CORP NINGBO POWER SUPPLY COMPANY, Ningbo (CN)

( * ) Notice: Subject to any disclaimer, the term of this patent is extended or adjusted under 35 U.S.C. 154(b) by 223 days.

(21) Appl. No.: 18/660,682

(22) Filed: May 10, 2024

(65) Prior Publication Data

US 2025/0005226 A1 Jan. 2, 2025

(30) Foreign Application Priority Data

Jun. 28, 2023 (CN) ......................... 202310770046.0

(51) Int. Cl.
*G06F 30/20* (2020.01)
*G06F 30/27* (2020.01)
(Continued)

(52) U.S. Cl.
CPC .............. *G06F 30/20* (2020.01); *G06F 30/27* (2020.01); *G06F 30/367* (2020.01);
(Continued)

(58) Field of Classification Search
CPC ........ G06F 30/20; G06F 30/27; G06F 30/367; G06F 2119/06; G06Q 50/06; H02J 3/00; H02J 2103/30; Y02E 60/00
(Continued)

(56) References Cited

FOREIGN PATENT DOCUMENTS

| | | | |
|---|---|---|---|
| CN | 104638654 | A | 5/2015 |
| CN | 106295001 | A | 1/2017 |

(Continued)

OTHER PUBLICATIONS

Subedi, Sunil, et al. "Review of methods to accelerate electromagnetic transient simulation of power systems." IEEE Access 9 (2021): 89714-89731. (Year: 2021).*

Shujun Yao et al., "A Large Time Step Electromagnetic Transients Simulation Based on Time-scale-frame Transformation", Proceedings of the CSEE, Jan. 20, 2019.

(Continued)

*Primary Examiner* — John E Johansen

(57) ABSTRACT

The present disclosure provides a power system operation simulation method, a simulation platform and a device. The method includes: acquiring a region category, a load class and a time scale of a power system; performing region division on the power system to obtain a plurality of temporary regions; acquiring node information of the temporary regions; preprocessing each piece of the node information to obtain a plurality of frequency information sets; when a maximum frequency of the frequency information sets is greater than a preset frequency threshold, obtaining a preset small step; when a maximum frequency of the frequency information sets is less than or equal to a preset frequency threshold, obtaining a preset large step; and performing electromagnetic transient simulation on the frequency information sets according to the preset small step, or performing electromagnetic transient simulation on the frequency information sets according to the preset large step.

19 Claims, 3 Drawing Sheets

(51) Int. Cl.
*G06F 30/367* (2020.01)
*G06F 119/06* (2020.01)
*G06Q 50/06* (2024.01)
*H02J 3/00* (2026.01)
*H02J 103/30* (2026.01)

(52) U.S. Cl.
CPC .......... *G06F 2119/06* (2020.01); *G06Q 50/06* (2013.01); *H02J 3/00* (2013.01); *H02J 2103/30* (2026.01); *Y02E 60/00* (2013.01)

(58) Field of Classification Search
USPC .......................................................... 703/18
See application file for complete search history.

(56) References Cited

FOREIGN PATENT DOCUMENTS

| | | | |
|---|---|---|---|
| CN | 108364238 | A | 8/2018 |
| CN | 110378022 | A | 10/2019 |
| CN | 111062145 | A | 4/2020 |
| WO | 2016188503 | A2 | 12/2016 |

OTHER PUBLICATIONS

Pan Deng et al., "Methods of Transient Model and Parallel Simulation of Region Segmentation in Active Distribution Network", Power System Technology, Apr. 30, 2020.

Tong Duan et al., "Variable Time-Stepping Parallel Electromagnetic Transient Simulation of Hybrid AC-DC Grids", IEEE, Sep. 30, 2020.

* cited by examiner

POWER SYSTEM OPERATION SIMULATION METHOD, SIMULATION PLATFORM AND DEVICE

CROSS-REFERENCE TO RELATED APPLICATION

This application claims priority from the Chinese patent application 2023107700460 filed Jun. 28, 2023, the content of which is incorporated herein in the entirety by reference.

TECHNICAL FIELD

The present disclosure relates to the technical field of power system simulation, and in particular, to a power system operation simulation method, a simulation platform and a device.

BACKGROUND

Electromagnetic transient simulation technology for power systems is a very important simulation technology in the field of power engineering, and mainly uses a numerical simulation method to simulate and study the electromagnetic transient characteristics in power systems. Since the power systems change rapidly, the characteristics thereof may have a serious impact on the power systems, such as damaging devices and affecting the safe operation of lines. To better study the characteristics of the power systems, it is necessary to analyze and simulate the characteristics by using the electromagnetic transient simulation technology for power systems.

Since it is difficult to verify the stability of power networks through physical experiments, accurate simulation technology is still an important tool for analyzing the power systems. Traditional alternating current networks use electromechanical transient simulation for analysis. This method has a large simulation step and cannot accurately analyze the high-frequency switching actions of power electronic components. Although small-step electromagnetic transient simulation can accurately analyze power electronic components, the amount of calculation required to analyze large-scale power system networks will be very large, and the calculation efficiency is very low.

With the wide application of direct current transmission, flexible alternating current transmission technology, large-scale new energy power generation and other power electronic devices to power systems, an electromagnetic transient simulation program based on modeling and a small step becomes an important tool for analyzing the power systems. However, the frequent switching actions and complex control strategies of a large number of power electronic devices cause power networks to generate a large number of harmonics and contain multi-band dynamic vectors, which makes the existing electromagnetic transient simulation efficiency extremely low and unable to meet the requirements of the existing power systems on the simulation efficiency in the research, production, simulation and other aspects.

SUMMARY

A problem to be solved by the present disclosure is how to improve the operation efficiency and simulation precision during the power system simulation.

To solve the above problem, the present disclosure provides a power system operation simulation method, which includes:

acquiring a region category, a load class and a time scale of a power system;

performing region division on the power system according to the region category, the load class and the time scale to obtain a plurality of temporary regions;

acquiring node information of the temporary regions;

preprocessing each piece of the node information to obtain a plurality of frequency information sets;

when a maximum frequency of the frequency information sets is greater than a preset frequency threshold, obtaining a preset small step according to the maximum frequency of the frequency information sets;

when a maximum frequency of the frequency information sets is less than or equal to a preset frequency threshold, obtaining a preset large step according to the maximum frequency of the frequency information sets; and performing electromagnetic transient simulation on the frequency information sets according to the preset small step, or performing electromagnetic transient simulation on the frequency information sets according to the preset large step.

Optionally, the obtaining a preset small step according to a maximum frequency of the frequency information sets when the maximum frequency of the frequency information sets is greater than a preset frequency threshold includes:

when the maximum frequency of the frequency information sets is greater than the preset frequency threshold, acquiring a preset frequency interval; and performing frequency division on each of the frequency information sets according to the preset frequency interval to obtain a plurality of pieces of band information, and obtaining the preset small step according to a maximum frequency of the band information.

Optionally, the node information includes voltage information and branch current information, and the performing electromagnetic transient simulation on the frequency information sets according to the preset small step includes:

performing electromagnetic transient simulation on corresponding band information according to the preset small step to obtain band simulation results of a voltage and a branch current of a corresponding node; and obtaining simulation results of the voltage and the branch current of the corresponding node according to simulation results of all bands.

Optionally, the performing region division on the power system according to the region category, the load class and the time scale to obtain a plurality of temporary regions includes:

dividing the power system according to the region category to obtain a plurality of first temporary regions;

dividing each of the first temporary regions according to the load class to obtain a plurality of second temporary regions;

dividing each of the second temporary regions according to the time scale to obtain a plurality of third temporary regions; and obtaining the plurality of temporary regions according to all the third temporary regions.

Optionally, the dividing each of the second temporary regions according to the time scale to obtain a plurality of third temporary regions includes:

acquiring a current time scale;

inputting the current time scale into a target prediction model to obtain predicted load data; and dividing the first temporary region according to the predicted load data to obtain the third temporary region.

Optionally, a construction method of the target prediction model includes:

acquiring historical time scale and historical load data;

training an initial prediction model according to the historical time scale to obtain initial predicted load data;

performing loss calculation according to the initial predicted load data and the historical load data to obtain loss function output; and adjusting model parameters of the initial prediction model according to the loss function output until loss function input meets a preset condition, and taking the initial prediction model after parameter adjustment as the target prediction model.

Optionally, the preprocessing each piece of the node information to obtain a plurality of frequency information sets includes:

performing Fourier series decomposition on the voltage information and the branch current information to obtain a plurality of component information; and obtaining the plurality of frequency information sets according to all the component information.

Compared with the prior art, the power system operation simulation method according to the present disclosure has the advantages that: region division is performed on a power system, frequency information sets are obtained according to node information of temporary regions, different simulation steps are set according to the frequency information of the frequency information sets, and then different nodes are simulated through the different simulation steps, which reduces the simulation scale and achieves parallel calculation of different nodes and different bands of a plurality of temporary regions, so that the calculation amount is greatly reduced, the operation efficiency and the simulation precision are improved, and the safety of the power system is further improved. Specifically, firstly, an entire power system is divided into a plurality of temporary regions through region information and a manual setting standard, and node information of the temporary regions is preprocessed to obtain corresponding frequency information sets, so that the parallel processing of the node information is achieved, the operation speed of the system is increased, and the simulation efficiency is further improved; in addition, the frequency information in the frequency information sets is compared with a preset frequency threshold, simulation steps are set for the frequency information sets, and the frequency information sets are simulated through different simulation steps, so that more frequency information can be considered during the simulation process, and the simulation precision is improved.

To solve the above technical problem, the present disclosure further provides a power system operation simulation platform, which includes:

an acquisition unit, configured to acquire a region category, a load class and a time scale of a power system;

a division unit, configured to perform region division on the power system according to the region category, the load class and the time scale to obtain a plurality of temporary regions;

a comparison unit, configured to acquire node information of the temporary regions; where the comparison unit is further configured to preprocess each piece of the node information to obtain a plurality of frequency information sets;

the comparison unit is further configured to: when a maximum frequency of the frequency information sets is greater than a preset frequency threshold, obtain a preset small step according to the maximum frequency of the frequency information sets;

the comparison unit is further configured to: when a maximum frequency of the frequency information sets is less than or equal to a preset frequency threshold, obtain a preset large step according to the maximum frequency of the frequency information sets; and a processing unit, configured to perform electromagnetic transient simulation on the frequency information sets according to the preset small step, or perform electromagnetic transient simulation on the frequency information sets according to the preset large step.

Compared with the prior art, the power system operation simulation platform has the same advantages as the power system operation simulation method. Details are not described herein again.

To solve the above technical problem, the present disclosure further provides a computer device, which includes a memory and a processor, the memory is configured to store a computer program; and the processor is configured to: when executing the computer program, implement the power system operation simulation method.

Compared with the prior art, the computer device has the same advantages as the power system operation simulation method. Details are not described herein again.

To solve the above technical problem, the present disclosure further provides a computer-readable storage medium, where the computer-readable storage medium stores a computer program, and when the computer program is read and run by a processor, the power system operation simulation method is implemented.

Compared with the prior art, the computer-readable storage medium has the same advantages as the power system operation simulation method. Details are not described herein again.

DETAILED DESCRIPTION OF EMBODIMENTS

To make the above objectives, features and advantages of the present disclosure more comprehensible, the specific embodiments of the present disclosure are described in detail with reference to the drawings.

Figure 1:
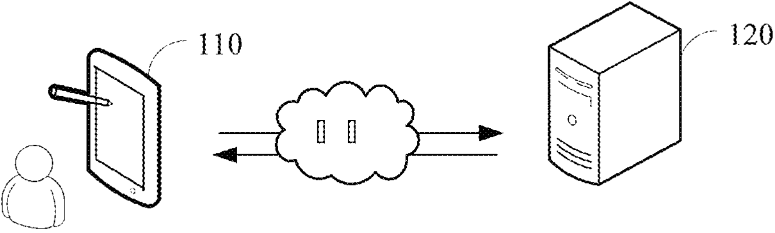
FIG. 1 is an application environment diagram of a power system operation simulation method according to an embodiment of the present disclosure.

FIG. 1 is an application environment diagram of a power system operation simulation method according to an embodiment of the present application. Referring to FIG. 1, the power system operation simulation method is applied to a power system operation simulation system. The power system operation simulation system includes a terminal 110 and a server 120. The terminal 110 and the server 120 are connected through a network. The terminal 110 may be a desktop terminal or a mobile terminal, and the mobile terminal may be at least one of a mobile phone, a tablet computer, a notebook computer and the like. The server 120 may be implemented as a stand-alone server or a server cluster including a plurality of servers.

Figure 2:
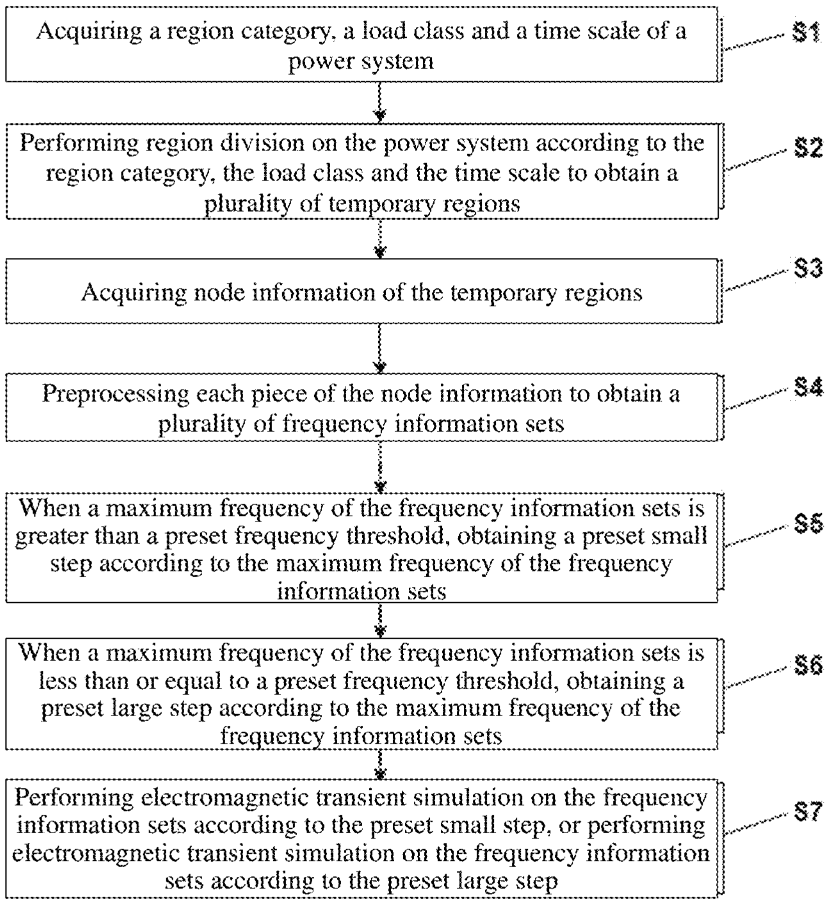
FIG. 2 is a flowchart of a power system operation simulation method according to an embodiment of the present disclosure.

As shown in FIG. 2, in an embodiment, provided is a power system operation simulation method, which includes the following steps:

Step S1: acquiring a region category, a load class and a time scale of a power system.

Specifically, the region category includes a new energy region and a non-new energy region, or power generation (a wind power plant, a photovoltaic power plant and the like) and power supply (such as a power substation) and the like; the load class generally means the power load should be classed according to the requirement on the reliability of power supply and the degree of political and economic loss or impact caused by interrupting the power supply, and generally includes a first-class load, a second-class load and a third-class load; and the time scale is a simulation moment selected when the power system simulation is performed, for example, the power simulation is performed when a short circuit occurs on a certain line in the power system at 12 o'clock, and the current time scale is selected as 12 o'clock.

Step S2: performing region division on the power system according to the region category, the load class and the time scale to obtain a plurality of temporary regions.

Specifically, the region division is performed on the power system sequentially through the region category, the load class and the time scale, for example, the region category is a new energy region and a non-new energy region, the power system is divided into the new energy region and the non-new energy region, the new energy region and the non-new energy region are divided through the first-class load, the second-class load and the third-class load, the region containing the first-class load in the new energy region is divided into four regions independently, the region containing the second-class load and the third-class load is divided into two regions, when the time scale is selected as 9 o'clock, predicted load data of the six regions at 9 o'clock after the power system is divided are obtained, and the six regions are divided according to the predicted load data to obtain a plurality of temporary regions.

Step S3: acquiring node information of the temporary regions.

Specifically, the node information includes voltage information and branch current information, namely, a voltage amount and a branch current amount at the node.

Step S4: preprocessing each piece of the node information to obtain a plurality of frequency information sets.

Specifically, each piece of the node information includes a component signal with multi-frequency components, and a plurality of independent component signals having unique frequency components can be obtained by performing frequency decomposition on each piece of the node information.

Step S5: when a maximum frequency of the frequency information sets is greater than a preset frequency threshold, obtaining a preset small step according to the maximum frequency of the frequency information sets.

Specifically, after the node information is subjected to frequency decomposition, component signals with multi-frequency components can be obtained, a frequency of each component signal is compared with a preset frequency threshold, when the maximum frequency is greater than the preset frequency threshold, a preset small step is obtained according to the maximum frequency, and the preset frequency threshold is set based on a requirement for actual precision.

Step S6: when a maximum frequency of the frequency information sets is less than or equal to a preset frequency threshold, obtaining a preset large step according to the maximum frequency of the frequency information sets.

Specifically, a frequency of each component signal is compared with a preset frequency threshold, and when the maximum frequency is less than or equal to the preset frequency threshold, a preset large step is obtained according to the maximum frequency.

Step S7: performing electromagnetic transient simulation on the frequency information sets according to the preset small step, or performing electromagnetic transient simulation on the frequency information sets according to the preset large step.

Specifically, when the maximum frequency of the frequency information sets is greater than a preset frequency threshold, a preset small step is obtained according to a maximum frequency of a current frequency information set, and all component signals in the current frequency information set are simulated through the preset small step; and when the maximum frequency of the frequency information sets is less than or equal to a preset frequency threshold, a preset large step is obtained through the maximum frequency, and all component signals in the current frequency information set are simulated through the preset large step, where the component signals include voltage component signals and branch current component signals.

Specifically, a region category, a load class and a time scale of an actual power system are acquired, the power system is sequentially subjected to hierarchical division through the region category, the load class and the time scale, then parallel processing and simulation are separately performed on temporary regions, the simulation speed can be improved by applying a parallel processing technology, and a plurality of frequency information sets are obtained by preprocessing node information of the temporary regions and preprocessing each piece of the node information. The fluctuation of corresponding nodes is judged through a preset frequency threshold during the simulation process. When the fluctuation of corresponding nodes is large, it indicates that the system failure has a great impact on the nodes in this region, the simulation step of this region is set to be a preset small step, that is, more accurate electromagnetic transient simulation is performed on a local network, so that the simulation precision of the whole power system is improved. When the fluctuation of corresponding nodes is small, it indicates that the system failure has little impact on the nodes in this region, and the simulation step of this region is set to be a preset large step, so that unnecessary calculation processes are reduced.

According to the power system operation simulation method described in this embodiment, region division is performed on the power system, frequency information sets are obtained according to node information of temporary regions, different simulation steps are set according to the frequency information of the frequency information sets, and then different nodes are simulated through the different simulation steps, which reduces the simulation scale and achieves parallel calculation of different nodes and different bands of a plurality of temporary regions, so that the calculation amount is greatly reduced, the operation efficiency and the simulation precision are improved, and the safety of the power system is further improved. Specifically, firstly, an entire power system is divided into a plurality of temporary regions through region information and a manual setting standard, and node information of the temporary regions is preprocessed to obtain corresponding frequency information sets, so that the parallel processing of the node information is achieved, the operation speed of the system is increased, and the simulation efficiency is further improved; in addition, the frequency information in the frequency information sets is compared with a preset frequency threshold, simulation steps are set for the frequency information sets, and the frequency information sets are simulated through different simulation steps, so that more frequency information can be considered during the simulation process, and the simulation precision is improved.

In some embodiments, in the step S5, the obtaining a preset small step according to a maximum frequency of the frequency information sets when the maximum frequency of the frequency information sets is greater than a preset frequency threshold includes:

step S51: when the maximum frequency of the frequency information sets is greater than the preset frequency threshold, acquiring a preset frequency interval; and step S52: performing frequency division on each of the frequency information sets according to the preset frequency interval to obtain a plurality of pieces of band information, and obtaining the preset small step according to a maximum frequency of the band information.

Specifically, the frequency information sets are sorted according to frequency sizes, and the sorted data are divided according to a preset frequency interval; for example, the frequency information sets include 200 Hz to 600 Hz, the preset frequency interval is 100 Hz, the frequency information sets are subjected to frequency division to obtain a plurality of pieces of band information of 200 Hz to 300 Hz, 300 Hz to 400 Hz, 400 Hz to 500 Hz, and 500 Hz to 600 Hz, different preset small steps are respectively set according to the maximum frequency in each piece of the band information, that is, four different preset small steps are set according to the four frequencies of 300 Hz, 400 Hz, 500 Hz and 600 Hz, and electromagnetic transient simulation is performed on the corresponding band information according to each preset small step. When the maximum frequency of the frequency information sets is greater than the preset frequency threshold, it indicates that the fluctuation is large, that is, the fault point has a greater impact here, the frequency information sets are subjected to frequency division, and electromagnetic transient simulation is performed on corresponding band information through different preset small steps, so that the transient simulation is more accurate, the simulation precision of the entire power system is improved, and the reduced operation speed caused by frequency division processing on each frequency information set can be relatively offset by performing parallel simulation on different band information.

In some embodiments, in the step S7, the node information includes voltage information and branch current information, and the performing electromagnetic transient simulation on the frequency information sets according to the preset small step includes:

step S71: performing electromagnetic transient simulation on corresponding band information according to the preset small step to obtain band simulation results of a voltage and a branch current of a corresponding node; and step S72: obtaining simulation results of the voltage and the branch current of the corresponding node according to simulation results of all bands.

Specifically, electromagnetic transient simulation is performed on the corresponding band information through the preset small step to obtain a band simulation result of corresponding voltage and branch current, and a simulation result of the voltage and the branch current of the current node is obtained by performing superposition processing on the simulation results of all the bands; the electromagnetic transient simulation is based on a digital simulation system for supercomputing and supports MATLAB and C++, where the MATLAB is used in the fields of data analysis, wireless communication, deep learning, image processing, computer vision, signal processing, quantitative financial and risk management, robots, control systems and the like; and C++ is a general-purpose programming language developed on the basis of the C language.

Figure 3:
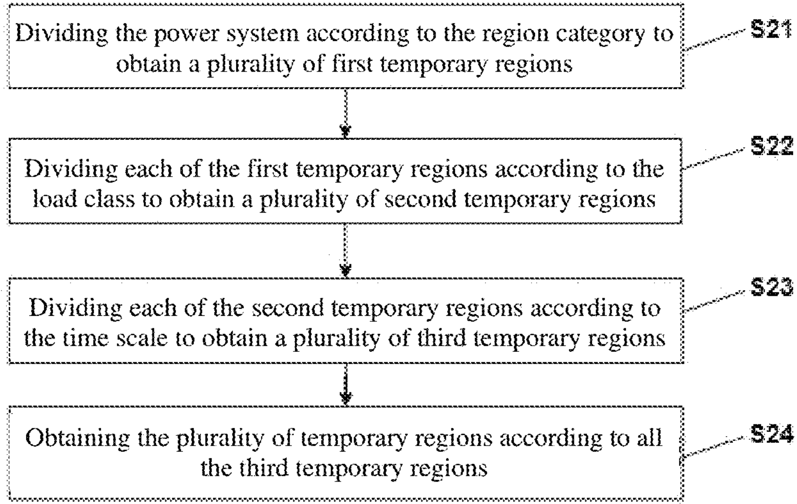
FIG. 3 is a flowchart of performing region division on a power system according to an embodiment of the present disclosure.

As shown in FIG. 3, in some embodiments, in the step S2, the performing region division on the power system according to the region category, the load class and the time scale to obtain a plurality of temporary regions includes:

step S21: dividing the power system according to the region category to obtain a plurality of first temporary regions;

step S22: dividing each of the first temporary regions according to the load class to obtain a plurality of second temporary regions;

step S23: dividing each of the second temporary regions according to the time scale to obtain a plurality of third temporary regions; and step S24: obtaining the plurality of temporary regions according to all the third temporary regions.

Specifically, the region category includes new energy and non-new energy, or power generation (a wind power plant, a photovoltaic power plant and the like) and power supply (such as a power substation) and the like, and can be set based on an actual condition; the load class generally means the power load should be classed according to the requirement on the reliability of power supply and the degree of political and economic loss or impact caused by interrupting the power supply, and generally includes a first-class load, a second-class load and a third-class load; and the time scale is considered because the emphasis may be different during the simulation process when different regions correspond to different time scales, for example, at the working moment of the device and the non-working moment of the device, the simulation results presented are different when analyzing the fault. The region division is performed on a power system, firstly, the entire power system is divided according to region category, then the first temporary region is divided according to the corresponding load class to obtain a plurality of second temporary regions, and each of the second temporary regions is divided according to the change of time scale to obtain a plurality of third temporary regions; for example, a power system is divided according to power generation and power supply to obtain two first temporary regions, each of the first temporary regions includes a first-class load region and a third-class load region, then each of the first temporary regions is divided into two second temporary regions according to the first-class load region and the third-class load region, and each of the second temporary regions is divided according to load changes of different time scales to obtain a plurality of third temporary regions. The entire power system is subjected to hierarchical division, that is, the entire system is divided. The entire system is divided first by a large-scale standard (region category), then divided by a relatively small class (load class), and finally divided by a smaller standard (time scale), so that the division results are more accurate and repetitive calculations can be avoided, for example, for load class criteria, namely, a first-class load, a second-class load and a third-class load, the size of load data of different time scales in a second-class load region and the size of load data of the third-class load region at the same moment are not determined, after the first temporary region is divided through load class, when the second temporary region in only third-class load is possibly divided through time scales, detailed division can be omitted, the unnecessary calculation process is avoided during the entire power system division process, and the amount of calculation in the simulation process of the entire power system is reduced. Therefore, during the process of large-scale simulation, the power system is divided into smaller temporary regions, and the temporary regions are subjected to parallel processing and simulation (by applying a parallel processing technology), so that the simulation speed can be increased, the simulation efficiency can be further increased, and meanwhile, when the failure occurs in the smaller temporary regions, the obtained data of the impact on other temporary regions adjacent to this temporary region are more accurate, so that the simulation data are more accurate, and the precision during the entire simulation process is increased; and the power system is divided according to a preset standard (a region category, a load class and a time scale, which can be set based on an actual condition), so that the flexibility is higher.

It should be noted that when the power system is subjected to region division, the number of first temporary regions and temporary regions can also be limited, that is, the number limitation will also be considered during the division process, which is specifically determined based on an actual condition. When the region division is performed according to the load class, the region units belonging to the first-class load may be divided first, and then the remaining regions may be divided according to the second-class load and the third-class load and by combining the region number limitation, which is specifically determined based on an actual condition.

In some embodiments, in the step S23, the dividing each of the second temporary regions according to the time scale to obtain a plurality of third temporary regions includes:

step S231: acquiring a current time scale;

step S232: inputting the current time scale into a target prediction model to obtain predicted load data; and step S233: dividing the first temporary region according to the predicted load data to obtain the plurality of third temporary regions.

Specifically, during simulation, a specific time scale (current time scale: simulation moment of current power system operation simulation) is selected, for example, 12 o'clock on a working day is selected, the current time scale is input into a trained target prediction model to obtain predicted load data (which can also be a predicted load curve) at this moment, and a corresponding third temporary region is divided according to the predicted load data at this moment, for example, when the predicted load data at this moment is relatively large, the corresponding third temporary region needs to be divided into five temporary regions, so that data analysis is more accurate, the simulation precision is improved, and a transient process is presented better; and when the predicted load data is relatively stable, the corresponding third temporary region may only be divided into two temporary regions, so that redundant calculation processes are reduced, and the operation speed is increased.

In some embodiments, a construction method of the target prediction model includes:

step T1: acquiring historical time scale and historical load data;

step T2: training an initial prediction model according to the historical time scale to obtain initial predicted load data;

step T3: performing loss calculation according to the initial predicted load data and the historical load data to obtain loss function output; and step T4: adjusting model parameters of the initial prediction model according to the loss function output until loss function input meets a preset condition, and taking the initial prediction model after parameter adjustment as the target prediction model.

Specifically, historical data of a corresponding region are acquired, the historical data include historical time scales and corresponding historical load data, the historical time scales are input into a preset prediction model for training to obtain predicted historical load data, cross entropy loss between initial predicted load data and the historical load data is calculated, internal parameters of the initial prediction model are adjusted according to the loss values, namely in the model training process, back propagation is performed through loss calculation (weighted loss) to perform parameter optimization on the initial prediction model, and the initial prediction model after parameter adjustment is used as a target prediction model.

In some embodiments, each of the frequency information sets includes a plurality of pieces of component information, and in the step S4, the preprocessing each piece of the node information to obtain a plurality of frequency information sets includes:

step S41: performing Fourier series decomposition on the voltage information and the branch current information to obtain a plurality of component information; and Step S42: obtaining the plurality of frequency information sets according to all the component information.

Specifically, since the acquired node information x(t) is a component signal including multi-frequency components, the real-time node information x(t) acquired from each node is subjected to frequency decomposition, and the original node information x(t) after the frequency decomposition becomes a plurality of mutually independent component signals with unique frequency components. A Fourier series form of the node information x(t) is:

$$X(t)=\sum_{h=-\infty}^{+\infty} X(t)e^{jh\omega_s t}; \tag{1}$$

in the formula (1), X (t) represents a Fourier series form of the node information x(t), $X_h$ (t) represents an $h^{th}$ harmonic dynamic phasor, multiplied by a rotation factor of a corresponding frequency to obtain a harmonic electrical signal, t represents time, the signal is a variable with time, j represents an imaginary symbol, @s represents an angular frequency of a fundamental frequency signal, h represents a harmonic frequency, which is theoretically infinite, but is generally a finite value in engineering applications, and in this case, the formula (1) can be written as follows:

$$X(t)=\sum_{h=-M}^{M}X_h(t)e^{jh\omega_s t}=\sum_{h=-M}^{M}X_h(t)e^{jh\omega_h t}; \tag{2}$$

in the formula (2), M represents a limited value of the harmonic order h in engineering applications, a value of M is determined by specific simulation requirements, $\omega_h$ represents an $h^{th}$ harmonic angular frequency, and $\omega_h = h\omega_s$.

According to the power system operation simulation method described in this embodiment, region division is performed on the power system, frequency information sets are obtained according to node information of temporary regions, different simulation steps are set according to the frequency information of the frequency information sets, and then different nodes are simulated through the different simulation steps, which reduces the simulation scale and achieves parallel calculation of different nodes and different bands of a plurality of temporary regions, so that the calculation amount is greatly reduced, the operation efficiency and the simulation precision are improved, and the safety of the power system is further improved. Specifically, firstly, an entire power system is divided into a plurality of temporary regions through region information and a manual setting standard, and node information of the temporary regions is preprocessed to obtain corresponding frequency information sets, so that the parallel processing of the node information is achieved, the operation speed of the system is increased, and the simulation efficiency is further improved; in addition, the frequency information in the frequency information sets is compared with a preset frequency threshold, simulation steps are set for the frequency information sets, and the frequency information sets are simulated through different simulation steps, so that more frequency information can be considered during the simulation process, and the simulation precision is improved.

Figure 4:
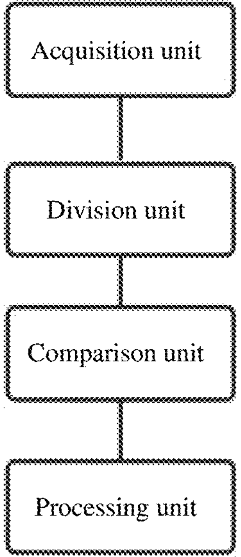
FIG. 4 is a diagram of a structure of a power system operation simulation platform according to an embodiment of the present disclosure.

As shown in FIG. 4, another embodiment of the present disclosure provides a power system operation simulation platform, which includes:

an acquisition unit, configured to acquire a region category, a load class and a time scale of a power system;

a division unit, configured to perform region division on the power system according to the region category, the load class and the time scale to obtain a plurality of temporary regions;

a comparison unit, configured to acquire node information of the temporary regions; where the comparison unit is further configured to preprocess each piece of the node information to obtain a plurality of frequency information sets;

the comparison unit is further configured to: when a maximum frequency of the frequency information sets is greater than a preset frequency threshold, obtain a preset small step according to the maximum frequency of the frequency information sets;

the comparison unit is further configured to: when a maximum frequency of the frequency information sets is less than or equal to a preset frequency threshold, obtain a preset large step according to the maximum frequency of the frequency information sets; and a processing unit, configured to perform electromagnetic transient simulation on the frequency information sets according to the preset small step, or perform electromagnetic transient simulation on the frequency information sets according to the preset large step.

The comparison unit in this embodiment is further configured to obtain a preset frequency interval when the maximum frequency of the frequency information sets is greater than the preset frequency threshold, perform frequency division on each of the frequency information sets according to the preset frequency interval to obtain a plurality of pieces of band information, and obtain the preset small step according to a maximum frequency of the band information.

The processing unit in this embodiment is further configured to perform electromagnetic transient simulation on corresponding band information according to the preset small step to obtain band simulation results of a voltage and a branch current of a corresponding node, and obtain simulation results of the voltage and the branch current of the corresponding node according to simulation results of all bands.

The division unit in this embodiment is further configured to divide the power system according to the region category to obtain a plurality of first temporary regions, divide each of the first temporary regions according to the load class to obtain a plurality of second temporary regions, divide each of the second temporary regions according to the time scale to obtain a plurality of third temporary regions; and obtain the plurality of temporary regions according to all the third temporary regions.

The comparison unit in this embodiment is further configured to perform Fourier series decomposition on the voltage information and the branch current information to obtain a plurality of component information; and obtain the plurality of frequency information sets according to all the component information.

Another embodiment of the present disclosure provides a computer device, which includes a memory, a processor, and a computer program that is stored in the memory and that may be run on the processor, where when the processor executes the computer program, the steps of the power system operation simulation method are implemented.

It should be noted that the device may be a computer device such as a server and a mobile terminal.

Figure 5:
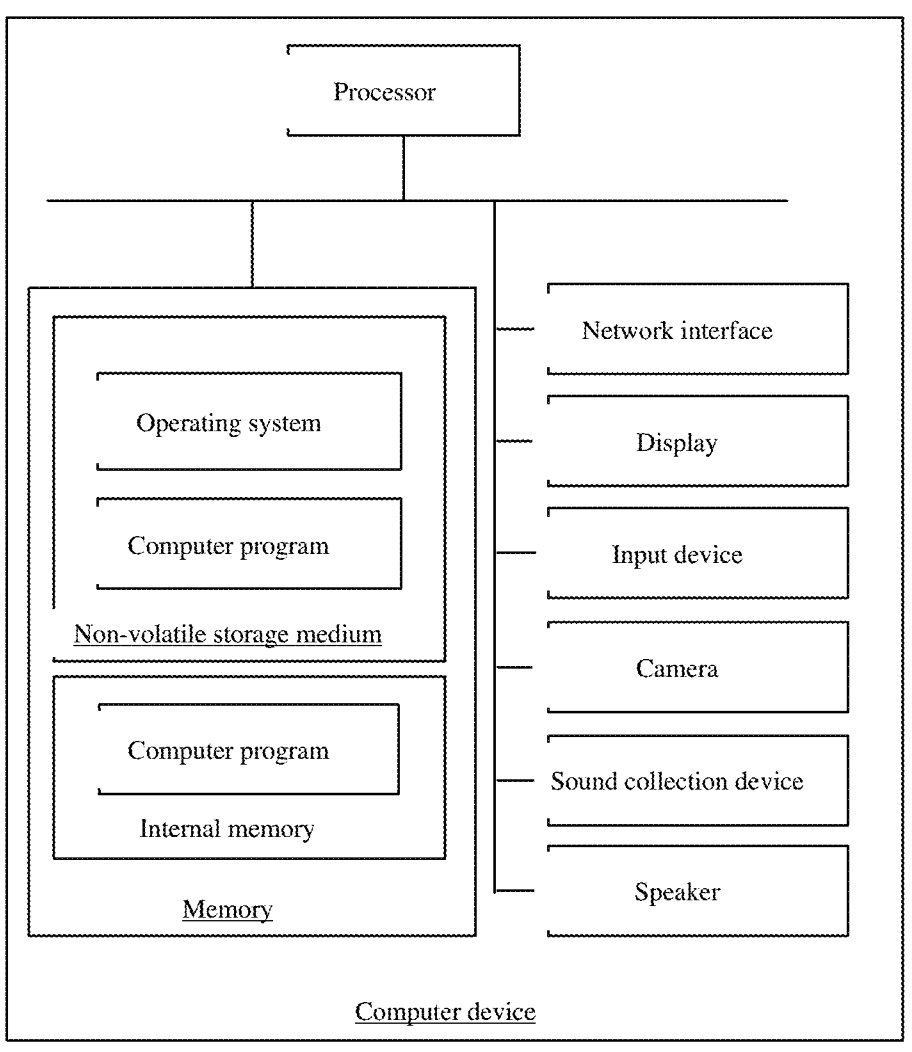
FIG. 5 is a diagram of an internal structure of a computer device according to an embodiment of the present disclosure.

FIG. 5 is a diagram showing an internal structure of a computer device according to an embodiment of the present disclosure. The computer device includes a processor, a memory, a network interface, an input device and a display which are connected through a system bus. The memory includes a non-volatile storage medium and an internal memory. The non-volatile storage medium of the computer device stores an operating system and may also store a computer program that, when executed by a processor, causes the processor to implement the power system operation simulation method. The internal memory may also store a computer program that, when executed by a processor, causes the processor to execute the power system operation simulation method. The display of the computer equipment may be a liquid crystal display or an electronic ink display, and the input device of the computer device may be a touch layer covered on the display, a key, a trackball or a touchpad arranged on a housing of the computer device, and an external keyboard, a touchpad or a mouse.

In an embodiment, provided is a computer-readable storage medium having a computer program stored thereon, and when the computer program is executed by a processor, the power system operation simulation method is implemented.

Those of ordinary skill in the art may understand that all or some of the procedures of the methods in embodiments may be implemented by a computer program instructing related hardware. The program may be stored in a non-volatile computer-readable storage medium. When the program runs, the procedures of the methods in embodiments may be performed. Any reference to memory, storage, databases or other media used in the embodiments provided herein may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, RAM is available in a variety of forms such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

It should be noted that, in the present disclosure, relational terms such as “first” and “second” are merely used to distinguish one entity or operation from another entity or operation without necessarily requiring or implying any actual relationship or order between such entities or operations. Moreover, terms “include”, “comprise”, or any other variants thereof are intended to cover a non-exclusive inclusion, so that a process, a method, an article, or a device that includes a list of elements includes those elements, and also includes other elements which are not expressly listed, or further includes elements inherent to this process, method, article, or device. An element preceded by “includes a . . . ” does not, without more constraints, preclude the existence of additional identical elements in the process, method, article, or device that includes the element.

The above description is only specific embodiments of the present disclosure to enable those skilled in the art to understand or implement the present disclosure. Various modifications to these embodiments will be readily apparent to those skilled in the art, and the generic principles defined herein may be applied to other embodiments without departing from the spirit or scope of the present disclosure. Thus, the present disclosure is not intended to be limited to these embodiments shown herein but is to be accorded the broadest scope consistent with the principles and novel features disclosed herein.

Although the present disclosure is disclosed as above, the protection scope of the present disclosure is not limited thereto. Various changes and modifications may be made by those skilled in the art without departing from the spirit and scope of the present disclosure, and these changes and modifications are intended to fall within the scope of the present disclosure.

The invention claimed is:

1. A power system operation simulation method, comprising:

acquiring a region category, a load class and a time scale of a power system;

performing region division on the power system according to the region category, the load class and the time scale to obtain a plurality of temporary regions;

acquiring node information of the temporary regions;

preprocessing each piece of the node information to obtain a plurality of frequency information sets;

when a maximum frequency of the frequency information sets is greater than a preset frequency threshold, obtaining a preset small step according to the maximum frequency of the frequency information sets;

when a maximum frequency of the frequency information sets is less than or equal to a preset frequency threshold, obtaining a preset large step according to the maximum frequency of the frequency information sets; and performing electromagnetic transient simulation on the frequency information sets according to the preset small step, or performing electromagnetic transient simulation on the frequency information sets according to the preset large step.

2. The power system operation simulation method according to claim 1, wherein the obtaining a preset small step according to a maximum frequency of the frequency information sets when the maximum frequency of the frequency information sets is greater than a preset frequency threshold comprises:

when the maximum frequency of the frequency information sets is greater than the preset frequency threshold, acquiring a preset frequency interval; and performing frequency division on each of the frequency information sets according to the preset frequency interval to obtain a plurality of pieces of band information, and obtaining the preset small step according to a maximum frequency of the band information.

3. The power system operation simulation method according to claim 2, wherein the node information comprises voltage information and branch current information, and the performing electromagnetic transient simulation on the frequency information sets according to the preset small step comprises:

performing electromagnetic transient simulation on corresponding band information according to the preset small step to obtain band simulation results of a voltage and a branch current of a corresponding node; and obtaining simulation results of the voltage and the branch current of the corresponding node according to simulation results of all bands.

4. The power system operation simulation method according to claim 1, wherein the performing region division on the power system according to the region category, the load class and the time scale to obtain a plurality of temporary regions comprises:

dividing the power system according to the region category to obtain a plurality of first temporary regions;

dividing each of the first temporary regions according to the load class to obtain a plurality of second temporary regions;

dividing each of the second temporary regions according to the time scale to obtain a plurality of third temporary regions; and obtaining the plurality of temporary regions according to all the third temporary regions.

5. The power system operation simulation method according to claim 4, wherein the dividing each of the second temporary regions according to the time scale to obtain a plurality of third temporary regions comprises:

acquiring a current time scale;

inputting the current time scale into a target prediction model to obtain predicted load data; and dividing the first temporary region according to the predicted load data to obtain the third temporary region.

6. The power system operation simulation method according to claim 5, wherein a construction method of the target prediction model comprises:

acquiring historical time scale and historical load data;

training an initial prediction model according to the historical time scale to obtain initial predicted load data;

performing loss calculation according to the initial predicted load data and the historical load data to obtain loss function output; and adjusting model parameters of the initial prediction model according to the loss function output until loss function input meets a preset condition, and taking the initial prediction model after parameter adjustment as the target prediction model.

7. The power system operation simulation method according to claim 3, wherein the preprocessing each piece of the node information to obtain a plurality of frequency information sets comprises:

performing Fourier series decomposition on the voltage information and the branch current information to obtain a plurality of component information; and obtaining the plurality of frequency information sets according to all the component information.

8. A computer device, comprising a memory, a processor, and a computer program that is stored in the memory and that may be run on the processor, wherein when the processor executes the computer program, the power system operation simulation method according to claim 1 is implemented.

9. A non-transitory computer-readable storage medium, wherein the non-transitory computer-readable storage medium stores a computer program, and when the computer program is read and run by a processor, the power system operation simulation method according to claim 1 is implemented.

10. The computer device according to claim 8, wherein the obtaining a preset small step according to a maximum frequency of the frequency information sets when the maximum frequency of the frequency information sets is greater than a preset frequency threshold comprises:

when the maximum frequency of the frequency information sets is greater than the preset frequency threshold, acquiring a preset frequency interval; and performing frequency division on each of the frequency information sets according to the, preset frequency interval to obtain a plurality of pieces of band information, and obtaining the preset small step according to a maximum frequency of the band information.

11. The computer device according to claim 10, wherein the node information comprises voltage information and branch current information, and the performing electromagnetic transient simulation on the frequency information sets according to the preset small step comprises:

performing electromagnetic transient simulation on corresponding band information according to the preset small step to obtain band simulation results of a voltage and a branch current of a corresponding node; and obtaining simulation results of the voltage and the branch current of the corresponding node according to simulation results of all bands.

12. The computer device according to claim 8, wherein the performing region division on the power system according to the region category, the load class and the time scale to obtain a plurality of temporary regions comprises:

dividing the power system according to the region category to obtain a plurality of first temporary regions;

dividing each of the first temporary regions according to the load class to obtain a plurality of second temporary regions;

dividing each of the second temporary regions according to the time scale to obtain a plurality of third temporary regions; and obtaining the plurality of temporary regions according to all the third temporary regions.

13. The computer device according to claim 12, wherein the dividing each of the second temporary regions according to the time scale to obtain a plurality of third temporary regions comprises:

acquiring a current time scale;

inputting the current time scale into a target prediction model to obtain predicted load data; and dividing the first temporary region according to the predicted load data to obtain the third temporary region.

14. The computer device according to claim 13, wherein a construction method of the target prediction model comprises:

acquiring historical time scale and historical load data;

training an initial prediction model according to the historical time scale to obtain initial predicted load data;

performing loss calculation according to the initial predicted load data and the historical load data to obtain loss function output; and adjusting model parameters of the initial prediction model according to the loss function output until loss function input meets a preset condition, and taking the initial prediction model after parameter adjustment as the target prediction model.

15. The computer device according to claim 11, wherein the preprocessing each piece of the node information to obtain a plurality of frequency information sets comprises:

performing Fourier series decomposition on the voltage information and the branch current information to obtain a plurality of component information; and obtaining the plurality of frequency information sets according to all the component information.

16. The non-transitory computer-readable storage medium according to claim 9, wherein the obtaining a preset small step according to a maximum frequency of the frequency information sets when the maximum frequency of the frequency information sets is greater than a preset frequency threshold comprises:

when the maximum frequency of the frequency information sets is greater than the preset frequency threshold, acquiring a preset frequency interval; and performing frequency division on each of the frequency information sets according to the preset frequency interval to obtain a plurality of pieces of band information, and obtaining the preset small step according to a maximum frequency of the band information.

17. The non-transitory computer-readable storage medium according to claim 16, wherein the node information comprises voltage information and branch current information, and the performing electromagnetic transient simulation on the frequency information sets according to the preset small step comprises:

performing electromagnetic transient simulation on corresponding band information according to the preset small step to obtain band simulation results of a voltage and a branch current of a corresponding node; and obtaining simulation results of the voltage and the branch current of the corresponding node according to simulation results of all bands.

18. The non-transitory computer-readable storage medium according to claim 9, wherein the performing region division on the power system according to the region category, the load class and the time scale to obtain a plurality of temporary regions comprises:

dividing the power system according to the region category to obtain a plurality of first temporary regions;

dividing each of the first temporary regions according to the load class to obtain a plurality of second temporary regions;

dividing each of the second temporary regions according to the time scale to obtain a plurality of third temporary regions; and obtaining the plurality of temporary regions according to all the third temporary regions.

19. The non-transitory computer-readable storage medium according to claim 18, wherein the dividing each of the second temporary regions according to the time scale to obtain a plurality of third temporary regions comprises:

acquiring a current time scale;

inputting the current time scale into a target prediction model to obtain predicted load data; and dividing the first temporary region according to the predicted load data to obtain the third temporary region.

* * * * *